United States Patent
Roch et al.

(10) Patent No.: US 9,825,858 B2
(45) Date of Patent: Nov. 21, 2017

(54) METHOD TO OPTIMIZE FLOW-BASED NETWORK FUNCTION CHAINING

(71) Applicant: Huawei Technologies Co., Ltd., Shenzhen (CN)

(72) Inventors: Evelyne Roch, Gatineau (CA); Zvika Bronstein, Hod Hasharon (IL)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/553,772

(22) Filed: Nov. 25, 2014

(65) Prior Publication Data

US 2016/0149811 A1    May 26, 2016

(51) Int. Cl.
  *H04L 12/28* (2006.01)
  *H04L 12/741* (2013.01)
  *H04L 12/801* (2013.01)

(52) U.S. Cl.
  CPC ............ *H04L 45/745* (2013.01); *H04L 47/10* (2013.01)

(58) Field of Classification Search
  CPC ..................................................... H04L 47/10
  See application file for complete search history.

(56) References Cited

U.S. PATENT DOCUMENTS

| | | | |
|---|---|---|---|
| 6,069,895 A | 5/2000 | Ayandeh | |
| 6,611,532 B1* | 8/2003 | Madour et al. | 370/466 |
| 6,868,085 B1* | 3/2005 | Konig et al. | 370/395.31 |
| 6,973,057 B1* | 12/2005 | Forslow | 370/328 |
| 2002/0061012 A1* | 5/2002 | Thi | H04B 3/23 370/352 |
| 2003/0043802 A1* | 3/2003 | Yazaki et al. | 370/389 |
| 2008/0186969 A1* | 8/2008 | Klish | H04L 63/105 370/392 |
| 2011/0317703 A1* | 12/2011 | Dunbar et al. | 370/392 |
| 2013/0028255 A1* | 1/2013 | Wu | H04L 45/16 370/390 |
| 2014/0229945 A1 | 8/2014 | Barkai et al. | |
| 2014/0334488 A1 | 11/2014 | Guichard et al. | |

FOREIGN PATENT DOCUMENTS

| | | |
|---|---|---|
| CN | 103607349 A | 2/2014 |
| CN | 104050045 A | 9/2014 |

* cited by examiner

*Primary Examiner* — Mohammad Anwar
*Assistant Examiner* — Angel Brockman
(74) *Attorney, Agent, or Firm* — Slater Matsil, LLP

(57) ABSTRACT

In a forwarding network comprising a function chain network controller, a plurality of intermediate network functions (NFs) and flow-based chain selectors (FBCSs) forming VNFs and configured to transfer data packets via a plurality of links, a method comprising a FBCS requesting substitution in the header representation of function chain entries of a data packet header in a flow with a different representation of function chain entries, wherein the flow bypasses at least one intermediate FBCS based on the substituted function chain entries representation. The function chain network controller discovers FBCS capable nodes and their topology, and maintains a function chain substitution state and distributes it to the FBCS relevant substitutions. The function chain network controller distributes a list of adjacent FBCSs to the FBCS, and distributes a list of abstracted adjacent FBCSs to the FBCS and translates requests from an abstracted value to a real value.

21 Claims, 7 Drawing Sheets

METHOD TO OPTIMIZE FLOW-BASED NETWORK FUNCTION CHAINING

TECHNICAL FIELD

The present disclosure is generally directed to packet network communications, and more particularly to flow-based network function chaining using source routing, label based forwarding or service header.

BACKGROUND

In packet networks, some flows may need to traverse a predetermined ordered set of network functions (NFs). The network functions may be virtualized as Virtualized Network Functions (VNFs) and implemented in various locations in the network, as opposed to Physical Network Functions (PNFs) implemented in physical boxes where the flow is forced to traverse the network functions of the physical middle boxes as they sit on the physical link or defined by their IP address.

Several methods can be used to force flows to traverse an ordered set of NFs. One of these methods is a source routing method and consists of inserting an ordered set of network function identifiers in the header for all packets corresponding to the flow, and then forwarding the packets from NF to NF as instructed in the header. A second method is based on label forwarding where a locally significant label is inserted by a NF1 when forwarding a packet to NF2 to instruct NF2 how to process and forward the packet to the following NF, the label being swapped at each NF. A third method is based on service header forwarding where a globally significant flow identifier is inserted and examined at each NF to determine how to process and forward the packet.

Some NFs are implemented by chaining other functions and additional NFs. Static service chains lead to performance degradation in packet forwarding as packets unnecessarily traverse NFs as some NFs only need to be traversed by the first packet of a flow, for example, to perform load balancing decisions. Dynamic service chains require complex network configuration and routing.

SUMMARY

This disclosure is directed to a flow-based network function chaining optimization.

According to one example embodiment, a method comprises a network function substituting entries in an original network function chain representation of a data packet header associated with a received flow with other entries to create a modified network function chain representation. The substitution directs the flow to bypass a network function in the original network function chain representation.

In some embodiments, the original network function chain representation is a source routed representation, wherein the substitution comprises removing or adding an entry to an ordered set of network functions. The original network function chain representation may be a locally significant label or a globally significant label. The substitution comprises pushing a label, popping a label, or setting a next network function. The network function requests substitutions of entries in the original network function chain representation for a specific flow from a network function. The network function maintains sub-flow tables that perform the substitutions and create a network function chain representation for each flow/sub-flow.

In another example embodiment, a method comprises a function chain network controller substituting entries in an original network function chain representation of a data packet header associated with a received flow with other entries to create a modified network function chain representation. The substitution directs the flow to bypass a network function in the original network function chain representation.

In some embodiments, the function chain network controller maintains a function chain substitution state, and distributes relevant substitutions to the network functions. The function chain network controller distributes a list of adjacent network functions to the network function. The function chain network controller maintains a mapping between abstracted network function value and real network function value, and translates requests from an abstracted network function value to a real network function value. The abstracted value is based on virtual network orchestration information and network function topology. The function chain network controller fully abstracts the network function adjacencies and translates each said request into zero, one or multiple requests to the network functions.

In another example embodiment, a function chain network controller is operable in a forwarding network comprising a plurality of intermediate network functions configured to transfer data packets via a plurality of links. The function chain network controller is configured to discover network functions in the network and their topology, and maintain a function chain substitution state and distribute relevant substitutions to the network functions.

In some embodiments, the function chain network controller is configured to distribute a list of adjacent network functions to the network functions. The function chain network controller is configured to distribute a list of abstracted adjacent network functions to the other network functions and translate substitution requests from an abstracted network function value to a real network function value. The abstracted adjacent network functions are based on virtual network orchestration information and network function topology. The function chain network controller is configured to fully abstract network, function adjacencies and translate a substitution request into zero, one or multiple requests to network functions.

In another example embodiment, a network function is configured to transfer data packets via a plurality of links in a network, and communicate with other network functions and request substitution of entries in function chain entries for a specific flow.

In some embodiments, the network function is configured to maintain sub-flow tables that are configured to perform the substitutions and create an ordered set of network functions for each flow/sub-flow.

In another example embodiment, a network function configured to transfer data packets via a plurality of links in a network, and communicate with other network functions and perform substitutions of entries in function chain entries for a specific flow.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

When intermediate network functions are themselves a flow-based chain selector (FBCS), methods and systems disclosed herein perform a substitution in the header of subsequent packets corresponding to a particular flow in order to optimize the processing of this flow by bypassing the intermediate FBCS. This might be the case if, for example, the flow-based chain selector is performing flow-based load balancing and once the load balancing decision for a flow has been made, the flow-based chain selector does not need to examine or process further packets for this flow.

This disclosure provides a system and method to perform such substitutions with the help of a network controller using software defined network (SDN) principles.

This disclosure provides a method to enable FBCSs to update the ordered set of network functions to traverse a particular flow, and the update is performed through a centralized function chain network controller.

At FBCS initialization, a network controller function provides each FBCS with an abstraction of the FBCSs that support chain substitutions. This abstraction may be based on virtual network orchestration information and FBCS topology.

When a FBCS x determines a network function chain for a flow f, it may request an adjacent FBCS to bypass FBCS x for future packets corresponding to flow f and send traffic to an ordered set of network functions x' instead. This bypass request is substituting the network function chain entry corresponding to FBCS x for a new ordered set of network function chain entries corresponding to network functions x' for flow f. FBCS x makes the request through the network controller that validates the request and translates the request from the abstract topology into the non-abstracted topology. Then, the network controller updates the adjacent FBCSs with the substitution of network function entries associated with x' for x for flow f.

In the case where no abstraction was provided, FBCS x may send the request directly to adjacent FBCSs, i.e. bypassing the network controller for faster response at the expense of the policy validation performed by the controller.

FBCSs maintain sub-flow tables that perform the substitutions as they create the ordered set of network functions for each flow/sub-flow.

Figure 1:
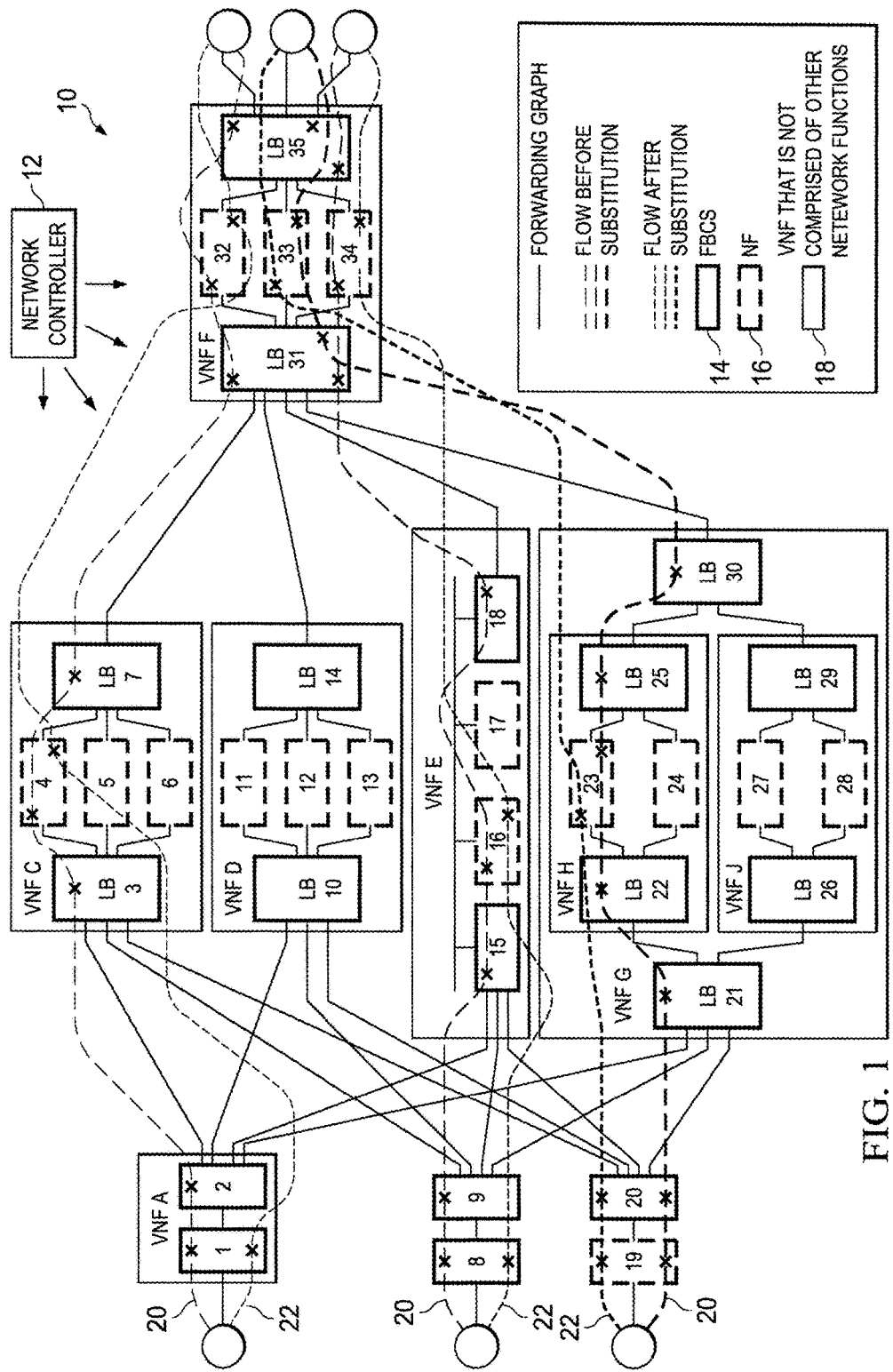
FIG. 1 illustrates network topology of an example packet based network illustrating various embodiments of this disclosure.

FIG. 1 illustrates network topology of an example packet based network 10 that is referred to throughout this disclosure to help illustrate various embodiments of this disclosure. FIG. 1 shows a function chain network controller 12, a plurality of FBCSs 14 that are specialized NFs that are configured to modify network function chains, and other NFs 16 that do not modify network function chains, as well as virtual NFs (VNFs) 18 that are composed of multiple network functions, some of which may be a FBCS, including load balancing (LB) functions or other functions such as Deep Packet Inspection (DPI) or other FBCS functions. FIG. 1 also shows packet flows 20 before substitution, and packet flows 22 after FBCS substitution.

Figure 2:
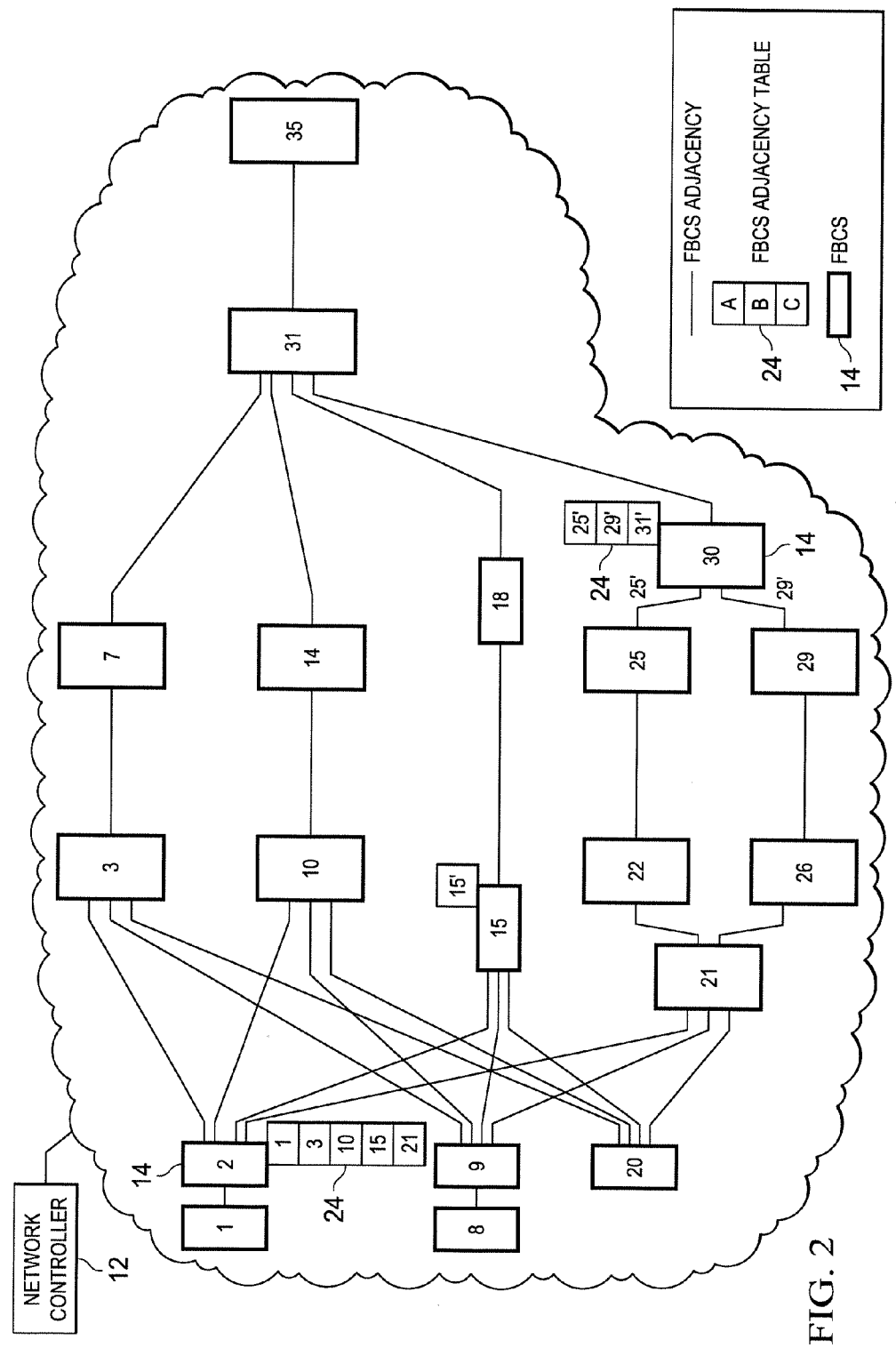
FIG. 2 illustrates a FBCS implementation that obtains a list of adjacent FBCSs from the network controller according to one embodiment of this disclosure.

FIG. 2 shows a FBCS implementation wherein some FBCSs 14 obtain a list 24 of adjacent FBCSs 14 from network controller 12. The list 24 comprises an FBCS adjacency table. The network controller 12 provides a virtual network view to each FBCS 14 that includes abstraction of the adjacent FBCSs 14. The different abstration models are:

No abstraction. This is shown at FBCS#2.

Identity abstraction. This is shown at FBCS#30.

Full abstraction. This is shown at FBCS#15. If full abstraction is supported, list 24 may not be provided but only confirm support of the functionality between the network controller 12 and FBCS 14.

Figure 3:
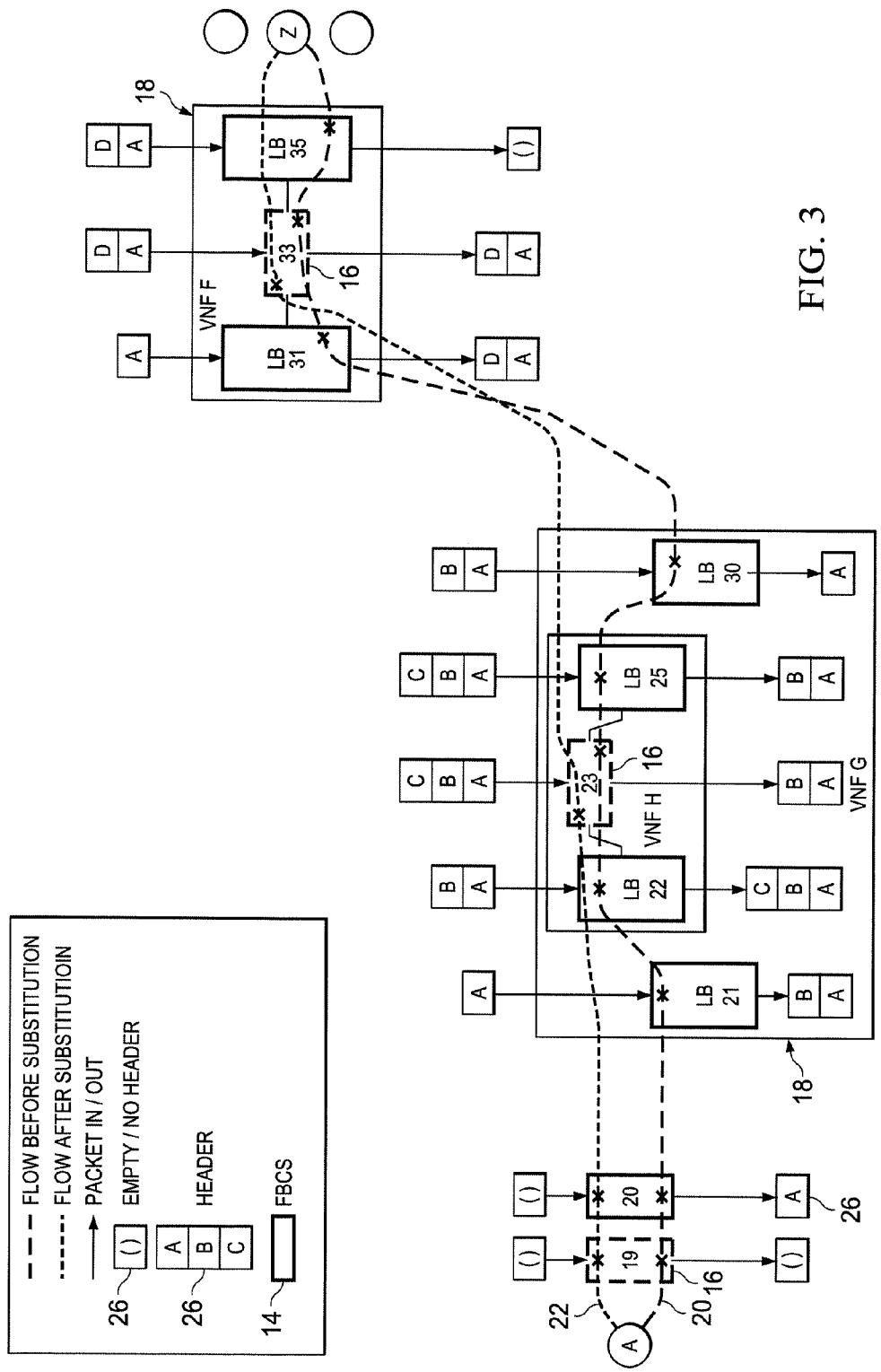
FIG. 3 illustrates each FBCS maintaining a flow table for the purpose of matching specific flows to an ordered set of network functions to be traversed.

Referring to FIG. 3, initially, each FBCS'14 maintains a flow table (Table 1) for the purpose of matching specific flows to an ordered set of network functions to be traversed, where network functions include FBCS functions and other functions that do not inspect/modify the chain of functions traversed. Entries in that flow table may be configured or determined locally include formats such as network function identifiers or locally or globally significant labels. The primary flow table contains entries where each entry includes:

(a) A match criteria to determine if the packet belongs to the specified flow (b) A representation of an ordered set of Network Functions, for example:

i. A representation where each Network Function is represented by a Network Function identifier inserted at a FBCS in the header.

ii. A representation where the next Network Function is represented by a locally significant label that a Network Function inserts in the packet header before forwarding the packet to the next Network Function.

iii. A representation where the entire Network Function list is represented by a globally significant label inserted at a FBCS in the header.

(c) Expiry criteria—may be null (d) Priority level

When a packet is received, the FBCS 14 searches the respective flow table for the highest priority matching flow. If a flow is found, a representation of an ordered set of Network Functions is included in the packet header 26. When the intermediate Network Functions receive the packet, they process the packet and either:

Forward the packet to the next Network Function;

Insert a representation of additional intermediate Network Functions to the header 26 and forward the packet to the new next Network Functions;

For some representations of the ordered set of Network Functions, the representation of the current Network Function may be removed.

Table 1 summarizes the flow tables at each FBCS 14 prior to substitutions. f20, f21, f22, f25, f30, f31 and f35 represent the flow criteria and may have the same or different criteria. Flow criteria are, for an example, an n-tuple of the IP header. For example, flow criteria f20 may be 2-tuple {source_IP, destination_IP} whereas flow criteria f21 may be 5-tuple {source_IP, destination_IP, protocol, source_port, destination_port}. This example is based on label entries. The action of pushing a label is defined as adding a label to the top of a label stack. The action of popping a label is defined as removing a label from the top of a label stack.

TABLE 1

| Node | Label | Instructions |
|------|-------|--------------|
| 19 | none | next hop = 20 |
| 20 | none | if flow = f20: push label A, next hop = 21 |
| 21 | A | if flow = f21, push label B, next hop = 22 |
| 22 | B | if flow = f22, push label C, next hop = 23 |
| 23 | C | next hop = 25 |
| 25 | C | if flow = f25, pop label, process next label |
| 25 | B | if flow = f25, next hop = 30 |
| 30 | B | if flow = f30, pop label |
| 30 | A | next hop = 31 |
| 31 | A | if flow = f31, push label D, next hop = 33 |
| 33 | D | next hop = 35 |
| 35 | D | if flow = f35, pop label |
| 35 | A | if flow = f35, pop label |
| 35 | none | if flow = f35, send to Z as non function chained packet |

Substitutions can be made at any FBCS 14. A FBCS function determines that for the flows 20 that traverse it, for example due to load balancing decisions, some of these sub-flows 22 may bypass the FBCS function and traverse a specific chain of network functions for each matching flow, whether for a specific number of packets, a specific duration or permanently. The FBCS function may request a substitution of the representation of its entry with a chain of network functions (that substitution may include a representation of network functions including other FBCS functions or may be empty).

Figure 4:
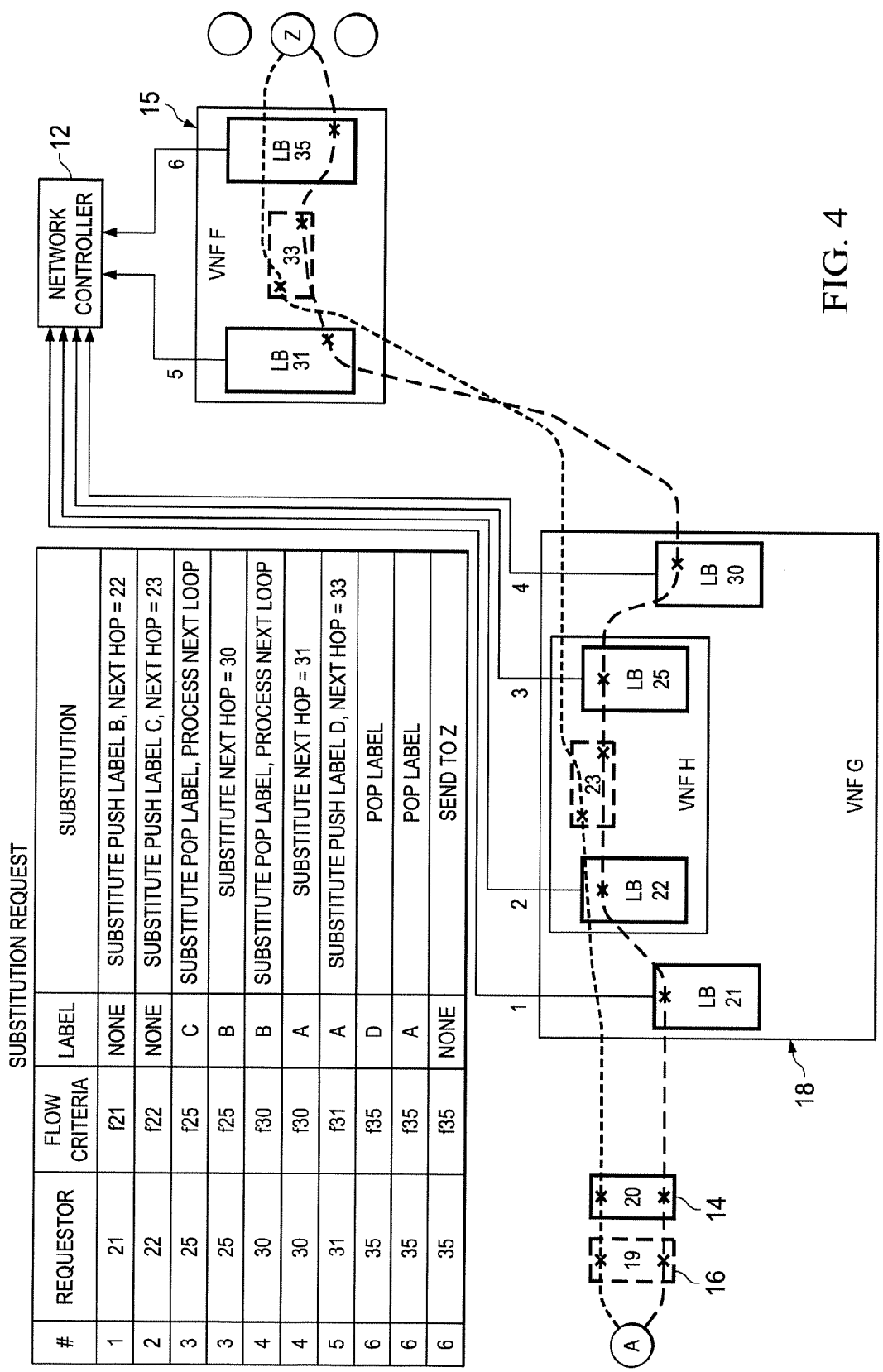
FIG. 4 illustrates the initial substitution requests for the example in FIG. 3 according to another embodiment.

That substitution request is normally sent through the network controller 12 and includes the FBCS identity of the requestor and abstracted identity of the recipient, the priority level, the flow match criteria for the substitution, the substitute representation of the ordered set of network functions and the expiration criteria for the substitution. The initial substitution requests for the example in FIG. 3 are shown in FIG. 4.

The network controller 12 is responsible for validating the requests against policy and translate each abstracted request into one or more substitution request towards the adjacent FBCSs 14. For faster responses, it may be possible for the requestor/recipient to exchange direct messages bypassing the network controller 12. In some implementations direct messaging is restricted to situations in which the participants possess sufficient information to validate each other's identity. This can be achieved by having the network controller 12 provide both participants with sufficient information to validate each other's identity and optionally to perform their own policy validation.

The network controller 12 may simply send the request to the adjacent FBCS 14 or it may also perform correlation and recursively update requests for FBCS located more than one hop away.

The network controller 12 may maintain the substitution tables or not. If it does not, each FBCS 14 may have to request further updates once they have received a substitution request. For example, if FBCS #21 requests substitution for flow criteria f21 corresponding to adding FBCS #22 to the representation of entries of the Network Function Chain but it receives a substitution request to substitute the representations of FBCS #22 for FBCS #23 and #25 if f22 is met, it may have to issue another request to substitute the representation of entries of the Network Function chain entry FBCS #21 for FBCS #23 and #25 if f21 and f22 match criteria are met.

Figure 5:
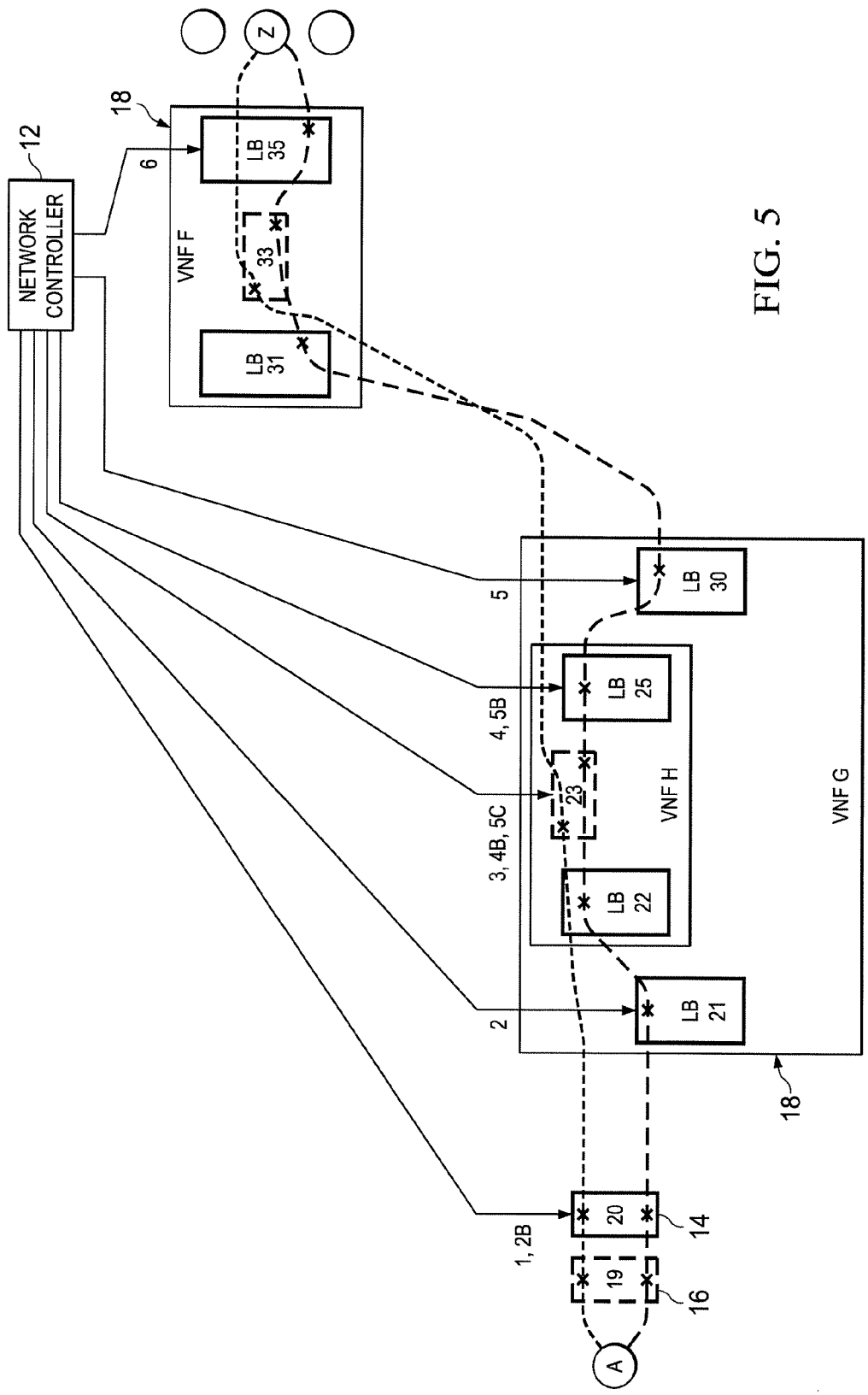
FIG. 5 illustrates the substitution requests from the network controller to FBCSs.

If the network controller 12 maintains the substitutions, it issues requests to FBCSs 14 directly. The substitution requests from the network controller to FBCSs are shown in FIG. 5. Based on the example in FIG. 4, after all substitutions are made, Table 2 shows the summary of the processing performed at each FBCS for the grey flow:

TABLE 2

| FBCS | Incoming Label | Flow Criteria | Substitution |
|------|----------------|---------------|--------------|
| 20 | None | f22&f21&f20 | push label A, push label B, push label C, next hop = 23 |
| 23 | C | f25 | pop label, process next label |
| 23 | B | f30&f25 | pop label, process next label |
| 23 | A | f31&f30&25 | push label D, next hop = 33 |
| 33 | D | f35 | pop label |
| 33 | A | f35 | pop label |
| 33 | none | f35 | send to Z |

Based on an example of f1 being a 2-tuple {source_IP, source_port} and f2 being a 2-tuple {source_IP, protocol}, the "&" represents the fact that match criteria on both sides must be met, i.e. f1&f2 represents the 3-tuple {source_IP, source_port, protocol}. For example, if f1={A,B} and f2={B,C}, f1&f2={A,B,C}.

Figure 6:
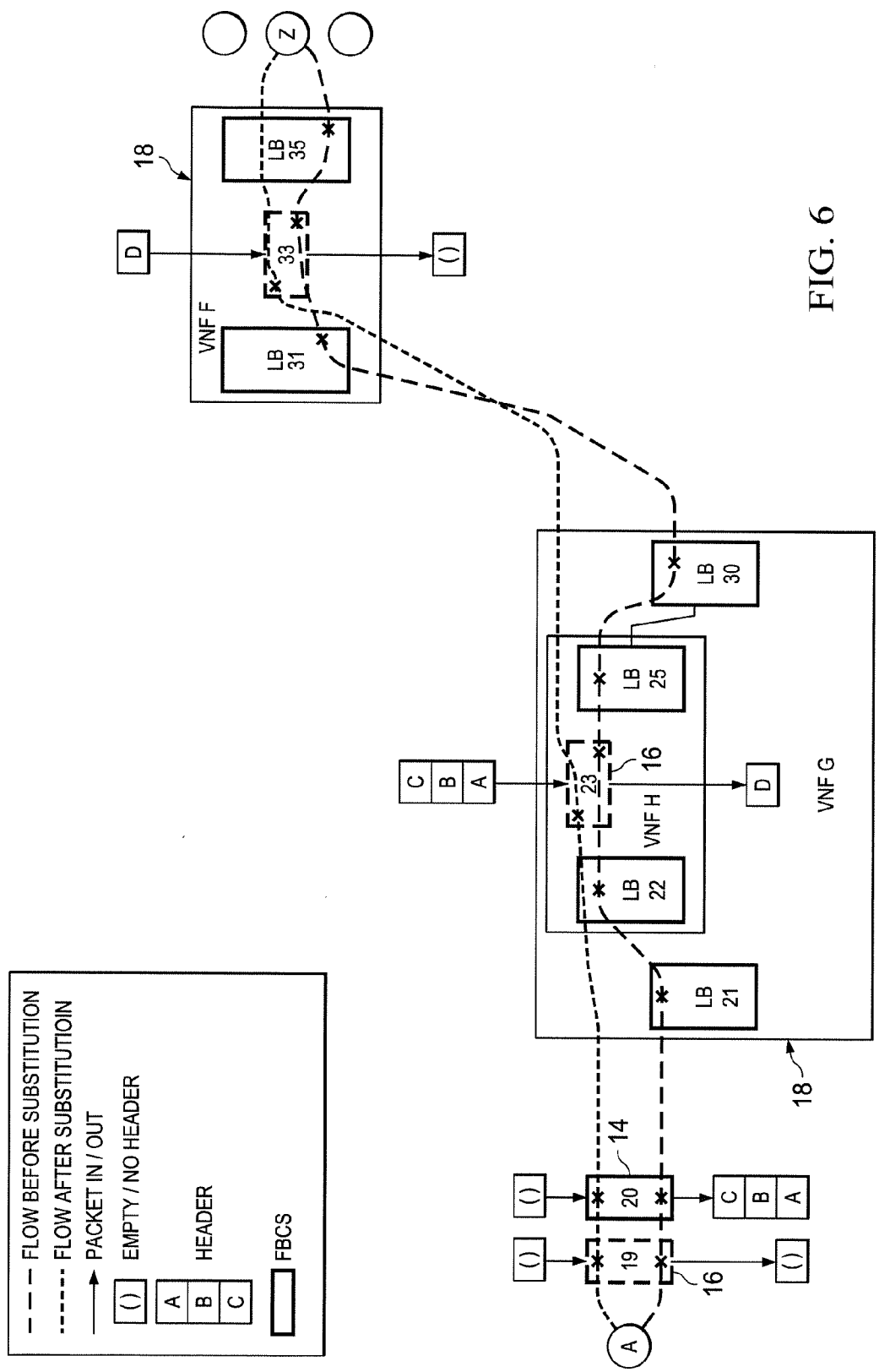
FIG. 6 illustrates the packet headers for the same flow shown in FIG. 3 after the substitutions according to another embodiment.

FIG. 6 shows the packet headers for the same flow shown in FIG. 3 after the substitutions.

There are also additional forwarding and substitution rules at all network functions. A subset is shown in Table 3 but several combinations of flow match criteria are omitted for simplicity.

TABLE 3

| | Labels and flow substitutions per node | | | Subset of label and flow tables per FBCS in decreasing order of priority | | |
|---|---|---|---|---|---|---|
| | Label | Flow | instructions | Label | Flow | Instructions |
| FBCS 20 | | | | | | |
| Initial | none | f20 | push label A, next hop = 21 | none | f22&f21&f20 | push label A, push label B, push label C, next hop = 23 |
| Substitution 1 | none | f21 | substitute push label B, next hop = 22 | none | f21&f20 | push label A, push label B, next hop = 22 |

TABLE 3-continued

| | Labels and flow substitutions per node | | | Subset of label and flow tables per FBCS in decreasing order of priority | | |
|---|---|---|---|---|---|---|
| | Label | Flow | instructions | Label | Flow | Instructions |
| Substitution 2b | none | f22 | substitute push label C, next hop = 23 | none | f20 | push label A, next hop = 21 |
| | | | | FBCS 21 | | |
| Initial | A | f21 | push label B, next hop = 22 | A | f22&f21 | push label B, push label C, next hop = 23 |
| Substitution 2 | A | f22 | substitute push label C, next hop = 23 | A | f21 | push label B, next hop = 22 |
| | | | | FBCS 22 | | |
| Initial | B | f22 | push label C, next hop = 23 | B | f22 | push label C, next hop = 23 |
| | | | | NF 23 | | |
| Initial | C | all flows | next hop = 25 | C | f25 | pop label, process next label |
| Substitution 3 | C | f25 | substitute pop label, process next label | C | all other flows | next hop = 25 |
| Substitution 3 | B | f25 | next hop = 30 | B | f30&f25 | pop label, process next label |
| Substitution 4b | B | f30 | substitute pop label, process next label | B | f25 | next hop = 30 |
| Substitution 4b | A | f30 | next hop = 31 | A | f31&f30&25 | push label D, next hop = 33 |
| Substitution 5c | A | f31 | substitute push label D, next hop = 33 | A | f30&25 | next hop = 31 |
| | | | | FBCS 25 | | |
| Initial | C | f25 | pop label, process next label | C | f25 | pop label, process next label |
| Initial | B | f25 | next hop = 30 | B | f30&f25 | pop label, process next label |
| Substitution 4 | B | f30 | substitute pop label, process next label | B | f25 | next hop = 30 |
| Substitution 4 | A | f30 | next hop = 31 | A | f31&f30&f25 | push D, next hop = 33 |
| Substitution 5b | A | f31 | substitute push label D, next hop = 33 | A | f30&f25 | next hop = 31 |
| | | | | FBCS 30 | | |
| Initial | B | f30 | pop label, process next label | B | f30 | pop label, process next label |
| Initial | A | f30 | next hop = 31 | A | f30&f31 | push label D, next hop = 33 |
| Substitution 5 | A | f31 | push label D, next hop = 33 | A | f30 | next hop = 31 |
| | | | | FBCS 31 | | |
| Initial | A | f31 | push label D, next hop = 33 | A | f31 | 33 |
| | | | | NF 33 | | |
| Initial | D | all flows | next hop = 35 | D | f35 | pop label |
| Substitution 6 | D | f35 | pop label | D | all other flows | next hop = 35 |
| Substitution 6 | A | f35 | pop label | A | f35 | pop label |
| Substitution 6 | none | f35 | send to Z | none | f35 | send to Z |
| | | | | FBCS 35 | | |
| Initial | D | f35 | pop label | D | f35 | pop label |
| Initial | A | f35 | pop label | A | f35 | pop label |
| Initial | none | f35 | send to Z | none | f35 | send to Z |

The substitution tables are maintained either at the network controller 12 or each FBCS 14. The substitutions include:
   Flow match criteria to determine if the packet belongs to the specified flow
   An ordered set of network functions including an
      Identifier
      Priority
      Pointer to substitution table for that Network Function
      Expiry criteria
      Entry owner (may differ from the Network function if recursive updates are applied)
The substitution tables are used to construct forwarding table rules for all the end-to-end flows 20, and their possible substitutions based on sub-flows resulting in end-to-end flows 22. Those forwarding table rules are used to forward packets that follow the proper network function chain based on the flow match criteria, bypassing network functions as described in the substitutions.

Note that the forwarding table rules may be implemented differently based on the underlying hardware and more complex structures than a single primary flow table may be used for scaling, performance and other reasons. This disclosure provides that the forwarding table rules match the FBCS decisions including substitutions.

This disclosure systems and methods that may provide performance improvement in packet forwarding as the packet only traverses the minimum set of network functions for each flow and sub-flow. The network configuration and routing is simplified as the substitutions are fully automated.

Figure 7:
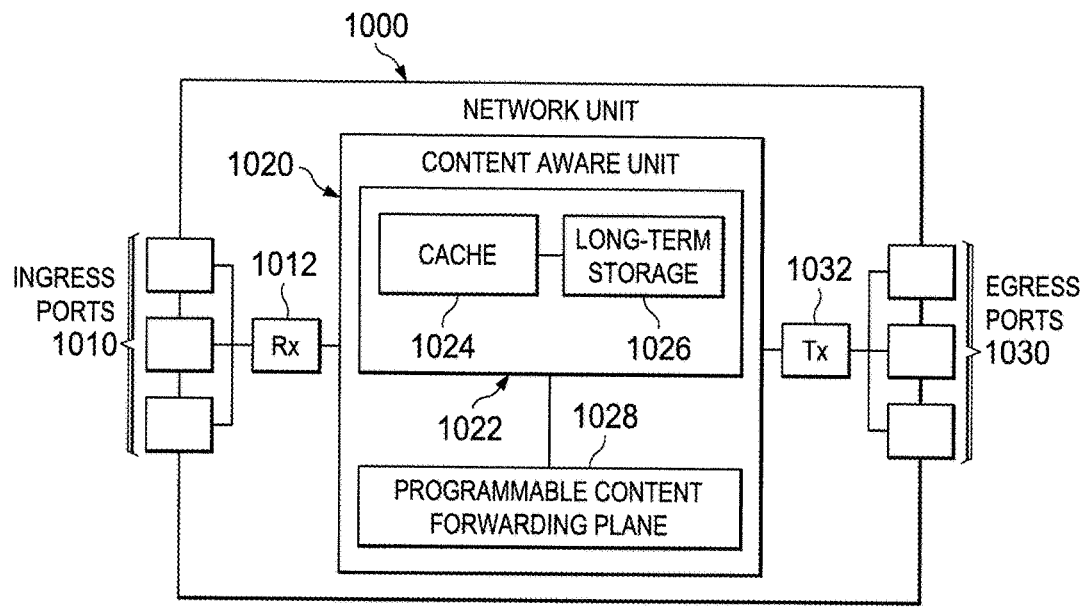
FIG. 7 illustrates an embodiment of a network unit in the forwarding network.

FIG. 7 illustrates an embodiment of a network unit 1000, which may be any device that transports and processes data through network 10. For instance, the network unit 1000 may correspond to or may be located in any of the system nodes described above, such as the device or server described above, for example, the controller, nodes and branches as described above. The network unit 1000 may correspond to or may be located in any of the system nodes described above. The network unit 1000 may also be configured to implement or support the schemes and methods described above. The network unit 1000 may comprise one or more ingress interfaces or units 1010 coupled to a receiver (Rx) 1012 for receiving signals and frames/data from other network components. The network unit 1000 may comprise a content aware unit 1020 to determine which network components to send content to. The content aware unit 1020 may be implemented using hardware, software, or both. The network unit 1000 may also comprise one or more egress interfaces or units 1030 coupled to a transmitter (Tx) 1032 for transmitting signals and frames/data to the other network components. The receiver 1012, content aware unit 1020, and transmitter 1032 may also be configured to implement at least some of the disclosed schemes and methods above, which may be based on hardware, software, or both. The components of the network unit 1000 may be arranged as shown in FIG. 7.

The content aware unit 1020 may also comprise a programmable content forwarding plane block 1028 and one or more storage blocks 1022 that may be coupled to the programmable content forwarding plane block 1028. The programmable content forwarding plane block 1028 may be configured to implement content forwarding and processing functions, such as at an application layer or L3, where the content may be forwarded based on content name or prefix and possibly other content related information that maps the content to network traffic. Such mapping information may be maintained in one or more content tables (e.g., CS, PIT, and FIB) at the content aware unit 1020 or the network unit 1000. The programmable content forwarding plane block 1028 may interpret user requests for content and accordingly fetch content, e.g., based on meta-data and/or content name (prefix), from the network or other content routers and may store the content, e.g., temporarily, in the storage blocks 1022. The programmable content forwarding plane block 1028 may then forward the cached content to the user. The programmable content forwarding plane block 1028 may be implemented using software, hardware, or both and may operate above the IP layer or L2.

The storage blocks 1022 may comprise a cache 1024 for temporarily storing content, such as content that is requested by a subscriber. Additionally, the storage blocks 1022 may comprise a long-term storage 1026 for storing content relatively longer, such as content submitted by a publisher. For instance, the cache 1024 and the long-term storage 1026 may include Dynamic random-access memories (DRAMs), solid-state drives (SSDs), hard disks, or combinations thereof.

Figure 8:
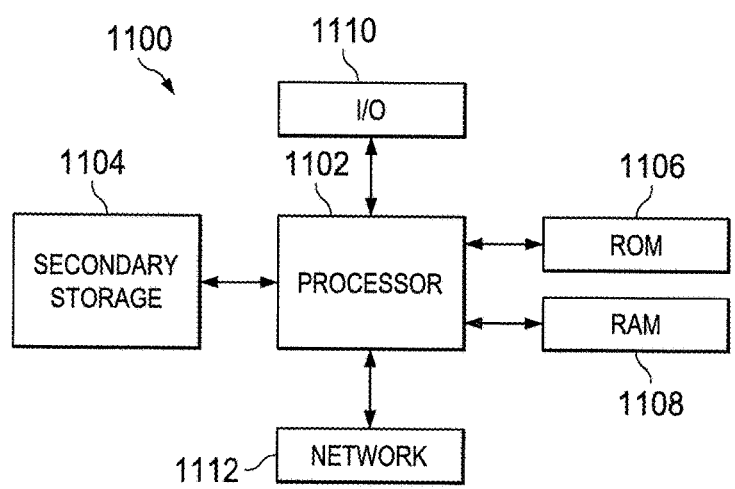
FIG. 8 illustrates a typical, general-purpose network component in the forwarding network.

The network components described above may be implemented on any general-purpose network component, such as a computer or network component with sufficient processing power, memory resources, and network throughput capability to handle the necessary workload placed upon it. FIG. 8 illustrates a typical, general-purpose network component 1100 suitable for implementing one or more embodiments of the components disclosed herein. The network component 1100 includes a processor 1102 (which may be referred to as a central processor unit or CPU) that is in communication with memory devices including secondary storage 1104, read only memory (ROM) 1106, random access memory (RAM) 1108, input/output (I/O) devices 1110, and network connectivity devices 1112. The processor 1102 may be implemented as one or more CPU chips, or may be part of one or more application specific integrated circuits (ASICs).

The secondary storage 1104 is typically comprised of one or more disk drives or tape drives and is used for non-volatile storage of data and as an over-flow data storage device if RAM 1108 is not large enough to hold all working data. Secondary storage 1104 may be used to store programs that are loaded into RAM 1108 when such programs are selected for execution. The ROM 1106 is used to store instructions and perhaps data that are read during program execution. ROM 1106 is a non-volatile memory device that typically has a small memory capacity relative to the larger memory capacity of secondary storage 1104. The RAM 1108 is used to store volatile data and perhaps to store instructions. Access to both ROM 1106 and RAM 1108 is typically faster than to secondary storage 1104.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   receiving a flow at a flow-based chain selector (FBCS) in a virtual network function (VNF), the FBCS in an original network function chain, from a previous network function in the original network function chain;
   at the FBCS, substituting an entry for the FBCS in the original network function chain represented in a data packet header associated with the received flow, with another entry for an intermediate network function in the VNF to create a modified network function chain representation; and
   transmitting by the FBCS, an instruction to the previous network function in the original network function chain to substitute the modified network function chain for the original network function chain for subsequent data packets in the flow;
   the substitution bypassing the FBCS in the VNF and directing the flow to the intermediate network function in the VNF.

2. The method as specified in claim 1, wherein the original network function chain representation is a source routed representation.

3. The method as specified in claim 2, wherein the substitution comprises removing or adding an entry to an ordered set of network functions.

4. The method as specified in claim 1, wherein the original network function chain representation is a locally significant label or a globally significant label.

5. The method as specified in claim 4, wherein the substitution comprises pushing a label, popping a label, or setting a next network function.

6. The method as specified in claim 1, wherein the FBCS requests substitutions of entries in the original network function chain representation for a specific flow from another network function.

7. The method as specified in claim 1, wherein the FBCS maintains sub-flow tables that perform the substitutions and create a network function chain representation for each flow/sub-flow.

8. A method comprising:
a function chain network controller receiving a request from a flow-based chain selector (FBCS) in a virtual network function (VNF), the FBCS in an original network function chain representation receiving a flow from a previous network function in the original network function chain, to bypass the FBCS;
the function chain network controller substituting entries for the FBCS in the original network function chain representation of a data packet header associated with the received flow, with other entries for an intermediate network function in the VNF to create a modified network function chain representation; and
the substitution bypassing the FBCS in the VNF and directing the flow from the previous network function in the original network function chain to the intermediate network function in the VNF.

9. The method as specified in claim 8, further comprising the function chain network controller:
maintaining a function chain substitution state; and
distributing substitutions to network functions in the original and modified network function chain representations in accordance with the function chain substitution state.

10. The method as specified in claim 8, further comprising the function chain network controller distributing a list of adjacent network functions to the FBCS.

11. The method as specified in claim 10, further comprising the function chain network controller:
maintaining a mapping between abstracted network function value and real network function value; and
translating requests from an abstracted network function value to a real network function value.

12. The method as specified in claim 11, wherein the abstracted value is based on virtual network orchestration information and network function topology.

13. The method as specified in claim 11, further comprising the function chain network controller fully abstracting the network function adjacencies and translates each said request into zero, one or multiple requests to network functions in the original and modified network function chain representations.

14. A function chain network controller operable in a forwarding network comprising a plurality of network functions configured to transfer data packets via a plurality of links, the function chain network controller comprising:
a processor; and
a non-transitory computer readable storage medium storing programming for execution by the processor, the programming including instructions to:
discover the network functions in the forwarding network and their topology;
maintain a function chain substitution state and distribute substitutions to the network functions in accordance with the function chain substitution state; and
direct a flow from a previous network function in an original network function chain to an intermediate network function in a virtual network function (VNF) and bypass a flow-based chain selector (FBCS) in the VNF, the FBCS in the original network function chain representation receiving the flow from the previous network function in the original network function chain, in accordance with a request from the FBCS to bypass the FBCS and direct the flow to the intermediate network function in the VNF.

15. The function chain network controller as specified in claim 14, wherein the programming includes instructions to distribute a list of adjacent network functions to the network functions.

16. The function chain network controller as specified in claim 14, wherein the programming includes instructions to distribute a list of abstracted adjacent network functions to other network functions and translate substitution requests from an abstracted network function value to a real network function value.

17. The function chain network controller as specified in claim 16, wherein the abstracted adjacent network functions are based on virtual network orchestration information and network function topology.

18. The function chain network controller as specified in claim 14, wherein the programming includes instructions to fully abstract network function adjacencies and translate a substitution request into zero, one or multiple requests to network functions.

19. A flow-based chain selector (FBCS) in a virtual network function (VNF) comprising:
a processor; and
a non-transitory computer readable storage medium storing programming for execution by the processor, the programming including instructions to:
receive a flow at the FBCS in an original network function chain from a previous network function in the original network function chain;
substitute by the FBCS an entry for the FBCS in the original network function chain represented in a data packet header associated with the received flow, with another entry for an intermediate network function in the VNF to create a modified network function chain representation; and
transmit by the FBCS an instruction to the previous network function in the original network function chain to substitute the modified network function chain for the original network function chain for subsequent data packets in the flow;
the substitution bypassing the FBCS in the VNF and directing the flow to the intermediate network function in the VNF.

20. The FBCS as specified in claim 19, wherein the programming includes instructions to maintain sub-flow tables to perform the substitutions and create an ordered set of network functions for each sub-flow.

21. A function chain network controller comprising:
a processor; and
a non-transitory computer readable storage medium storing programming for execution by the processor, the programming including instructions to:
receive a request from a flow-based chain selector (FBCS) in a virtual network function (VNF), the FBCS in an original network function chain representation receiving a flow from a previous network function in the original network function chain, to bypass the FBCS and direct the flow to an intermediate network function in the VNF;

substitute entries for the FBCS in the original network function chain representation of a data packet header associated with the received flow, with other entries for the intermediate network function to create a modified network function chain representation; and the substitution bypassing the FBCS in the VNF and directing the flow from the previous network function in the original network function chain to the intermediate network function in the VNF.

\* \* \* \* \*